US009753967B2

(12) United States Patent
Meng et al.

(10) Patent No.: US 9,753,967 B2
(45) Date of Patent: Sep. 5, 2017

(54) COMPUTING SYSTEM WITH ERROR DETECTION MECHANISM AND METHOD OF OPERATION THEREOF

(71) Applicant: Samsung Electronics Co., Ltd., Suwon-si, Gyeonggi-Do (KR)

(72) Inventors: Yunsong Meng, Fremont, CA (US); Doreen Cheng, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 197 days.

(21) Appl. No.: 14/230,841

(22) Filed: Mar. 31, 2014

(65) Prior Publication Data

US 2015/0278285 A1 Oct. 1, 2015

(51) Int. Cl.
*G06F 17/30* (2006.01)

(52) U.S. Cl.
CPC .... *G06F 17/30371* (2013.01); *G06F 17/3053* (2013.01); *G06F 17/3097* (2013.01); *G06F 17/30864* (2013.01)

(58) Field of Classification Search
CPC ................................................ G06F 17/30864
See application file for complete search history.

(56) References Cited

U.S. PATENT DOCUMENTS 7,716,235 B2 5/2010 Davallou
7,930,302 B2 * 4/2011 Bandaru ........... G06F 17/30864 707/737
2002/0188600 A1 * 12/2002 Lindsay ............ G06F 17/30466
2003/0130987 A1 * 7/2003 Edlund ............. G06F 17/30241
2006/0074901 A1 * 4/2006 Pirahesh ........... G06F 17/30466
2006/0242204 A1 * 10/2006 Karas ................ G06F 17/30578
2006/0259442 A1 * 11/2006 Iqbal .................. G06Q 30/0283 705/400
2009/0112816 A1 * 4/2009 Marlow ............ G06F 17/30241
2010/0228712 A1 * 9/2010 Wexler ............. G06F 17/30864 707/706
2011/0055169 A1 * 3/2011 Yalamanchi ...... G06F 17/30371 707/690
2011/0055172 A1 * 3/2011 Tan .................. G06F 17/30241 707/692
2011/0191319 A1 * 8/2011 Nie .................. G06F 17/30864 707/706
2011/0320410 A1 * 12/2011 Marum ............ G06F 17/30448 707/687
2012/0265779 A1 10/2012 Hsu et al.
2012/0265784 A1 10/2012 Hsu et al.
2012/0265787 A1 10/2012 Hsu et al.
2015/0026189 A1 * 1/2015 Li .................... G06F 17/30911 707/741

* cited by examiner

*Primary Examiner* — Mohammad S Rostami
(74) *Attorney, Agent, or Firm* — IP Investment Law Group

(57) ABSTRACT

A system includes: a storage unit configured to receive an input query; and a control unit, coupled to the storage unit, configured to: identify input query components in the input query; detect a query conflict between one or more of the input query components; generate a conflict free query based on the input query components; and generate a query response for the conflict free query for displaying on a device.

20 Claims, 4 Drawing Sheets

100
102
104
106

COMPUTING SYSTEM WITH ERROR DETECTION MECHANISM AND METHOD OF OPERATION THEREOF

TECHNICAL FIELD

An embodiment of the present invention relates generally to a computing system, and more particularly to a system for error detection and correction.

BACKGROUND

Modern consumer and industrial electronics, especially devices such as graphical computing systems, televisions, projectors, cellular phones, portable digital assistants, and combination devices, are providing increasing levels of functionality to support modern life including device assisted task execution services. Research and development in the existing technologies can take a myriad of different directions.

As users become more empowered with the growth of electronic and computing systems, new and old paradigms begin to take advantage of this new device space. One such advancement has been intelligent or device assisted task execution and information retrieval. However the ability to provide accurate or satisfactory responses for task execution and information retrieval has presented new challenges for the users.

Thus, a need still remains for a computing system with error detection mechanism for device assisted task execution and information retrieval. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: a storage unit configured to receive an input query; and a control unit, coupled to the storage unit, configured to: identify input query components in the input query; detect a query conflict between one or more of the input query components; generate a conflict free query based on the input query components; and generate a query response for the conflict free query for displaying on a device.

An embodiment of the present invention provides a method of operating a computing system including: receiving an input query; identifying input query components in the input query; detecting a query conflict between one or more of the input query components; generating a conflict free query based on the input query components; and generating a query response for the conflict free query for displaying on a device.

An embodiment of the present invention provides a non-transitory computer readable medium including instructions for operating a computing system of: receiving an input query; identifying input query components in the input query; detecting a query conflict between one or more of the input query components; generating a conflict free query based on the input query components; and generating a query response for the conflict free query for displaying on a device.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
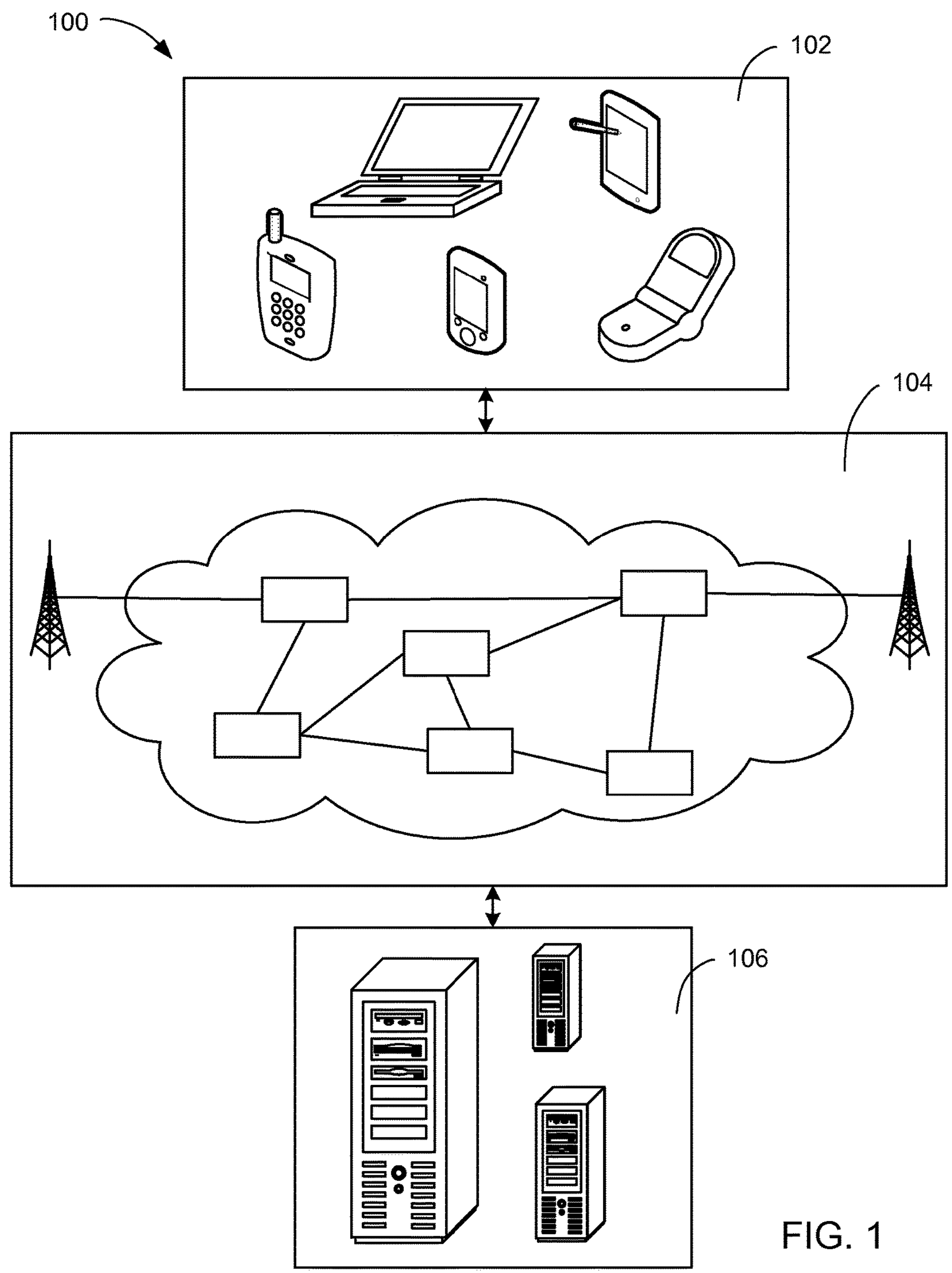
FIG. 1 is a computing system with error detection mechanism in an embodiment of the present invention.

An embodiment of the present invention provides improved processing efficiency. The detection of the query conflict in the input query reduces the likelihood of an error occurring during execution of the input query which improves processing efficiency.

A further embodiment of the present invention provides accurate generation of the conflict free query. Generating the query candidates having the candidate rank calculated based on the query context enables the computing system to generate the conflict free query most similar to the input query, which improves the accuracy of the conflict free query.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation.

The term "module" referred to herein can include software, hardware, or a combination thereof in an embodiment of the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Referring now to FIG. 1, therein is shown a computing system 100 with error detection mechanism in an embodiment of the present invention. The computing system 100 includes a first device 102, such as a client or a server, connected to a second device 106, such as a client or server. The first device 102 can communicate with the second device 106 with a communication path 104, such as a wireless or wired network.

For example, the first device 102 can be of any of a variety of devices, such as a cellular phone, personal digital assistant, a notebook computer, a liquid crystal display (LCD) system, a light emitting diode (LED) system, or other multi-functional display or entertainment device. The first device 102 can couple, either directly or indirectly, to the communication path 104 to communicate with the second device 106 or can be a stand-alone device.

The second device 106 can be any of a variety of centralized or decentralized computing devices, or video transmission devices. For example, the second device 106 can be a multimedia computer, a laptop computer, a desktop computer, a video game console, grid-computing resources, a virtualized computer resource, cloud computing resource, routers, switches, peer-to-peer distributed computing devices, a media playback device, a Digital Video Disk (DVD) player, a three-dimension enabled DVD player, a recording device, such as a camera or video camera, or a combination thereof. In another example, the second device 106 can be a signal receiver for receiving broadcast or live stream signals, such as a television receiver, a cable box, a satellite dish receiver, or a web enabled device.

The second device 106 can be centralized in a single room, distributed across different rooms, distributed across different geographical locations, embedded within a telecommunications network. The second device 106 can couple with the communication path 104 to communicate with the first device 102.

For illustrative purposes, the computing system 100 is described with the second device 106 as a computing device, although it is understood that the second device 106 can be different types of devices. Also for illustrative purposes, the computing system 100 is shown with the second device 106 and the first device 102 as end points of the communication path 104, although it is understood that the computing system 100 can have a different partition between the first device 102, the second device 106, and the communication path 104. For example, the first device 102, the second device 106, or a combination thereof can also function as part of the communication path 104.

The communication path 104 can span and represent a variety of networks and network topologies. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104. Further, the communication path 104 can traverse a number of network topologies and distances. For example, the communication path 104 can include direct connection, personal area network (PAN), local area network (LAN), metropolitan area network (MAN), wide area network (WAN), or a combination thereof.

Figure 2:
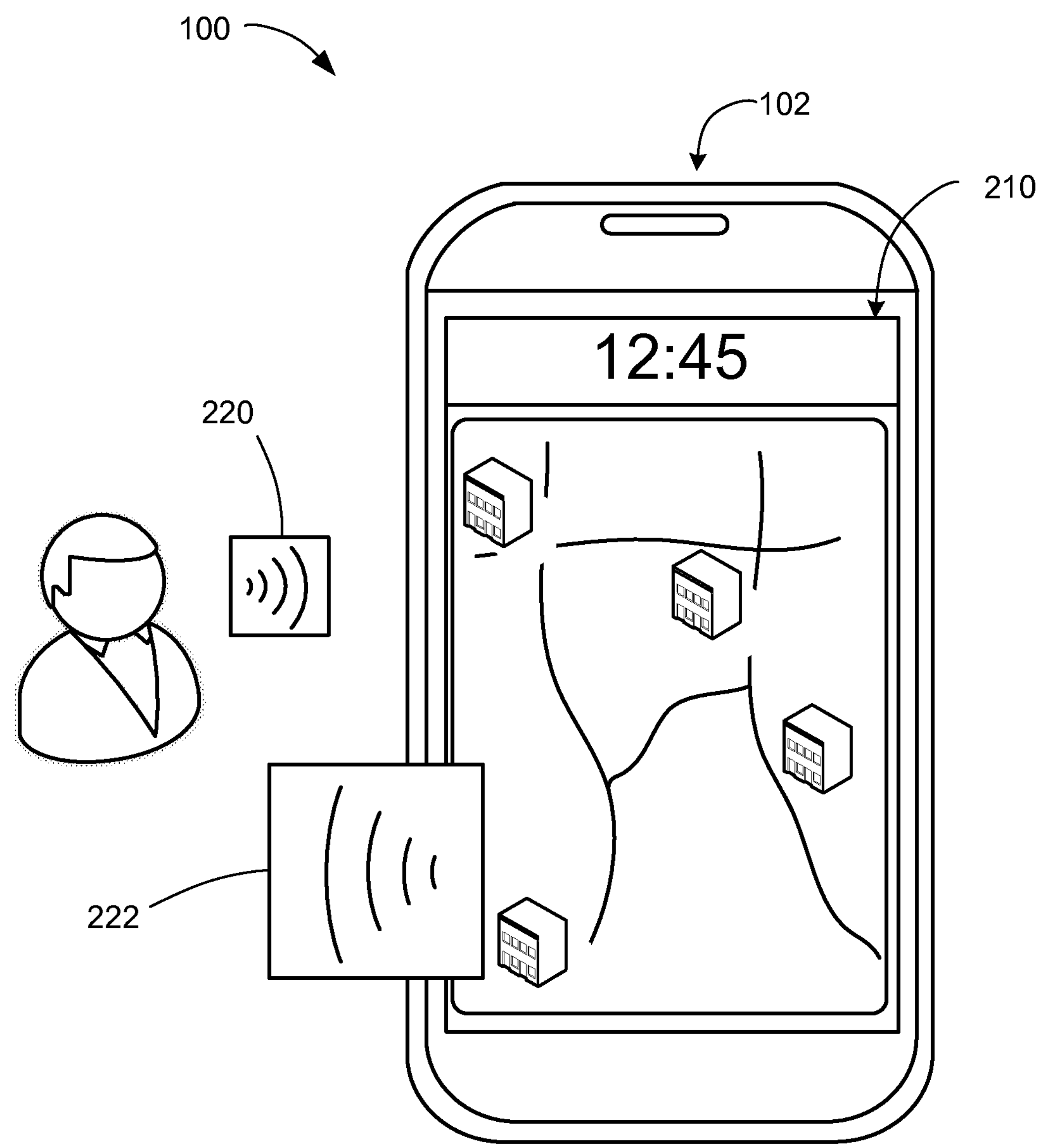
FIG. 2 is an example of a display interface of the first device of FIG. 1.

Referring now to FIG. 2, therein is shown an example of a display interface 210 of the first device 102. The first device 102 can receive an input query 220. The input query 220 is a request for the device to perform or execute a task. For example, the input query 220 can be an implicit or explicit request. As an example of the explicit request, the input query 220 can be a request by the user to search for a location, such as "Get me directions to Hungry Howie's in Santa Cruz", retrieve information, such as "when is my next appointment?", or perform a task with an application on the first device 102, such as a request to play a song with a music player "Play 'We Are the Champions' by 'Freddie Mercury'". The input query 220 can be expressed as key words, phrases, or natural language sentences. As an example of the implicit request, the input query 220 can be a request generated without direct user input, such as a service or application that can automatically, preemptively, or proactively generate the input query 220 on behalf of the user based on context triggers. In a specific example, the input query 220 for the implicit request can be based on context triggers, such as activities or actions of the user, the location of the user, or events or occurrences pertaining to the environment.

The computing system 100 can detect errors in the input query 220 prior to performing or executing the task of the input query 220. As an example, for the input query 220 of "Get me directions to Hungry Howie's in Santa Cruz", the computing system 100 can determine that an error will occur that will prevent generation of direction to "Hungry Howie's in Santa Cruz" because "Hungry Howie's" does not exist in the city of Santa Cruz. In another example, for the input query 220 of "Play 'We Are the Champions' performed by 'Freddie Mercury'", the computing system 100 can determine that an error will occur which will prevent playing the song "We are the Champions" since the song was performed by the music group "Queen", although Freddie Mercury wrote and sang the song as a member of the music group.

In one instance, when the computing system 100 detects the error in the input query 220, the computing system 100 can modify the input query 220 that will avoid the error and generate a query response 222. For example, for the input query 220 of "Get me directions to Hungry Howie's in Santa Cruz", the computing system 100 can determine that "Hungry Howie's" is a restaurant that serves pizzas and can generate the query response 222 providing directions to a different restaurant serving pizza that is located in the city of Santa Cruz.

In another instance, the computing system 100 can generate the query response 222 that presents one or more modified queries associated with the input query 220 for selection by the user when the computing system detects an error in the input query 220. For example, the computing system 100 can include the query response 222 that presents a predetermined number of modified queries responses having the highest degree of semantic similarity to the input query 220. In yet a further instance, the computing system 100 can generate the query response 222 that includes a request for clarification of the input query 220 when the computing system detects an error in the input query 220. The above described instances of the functions performed by the computing system 100 will be discussed in detail below.

Figure 3:
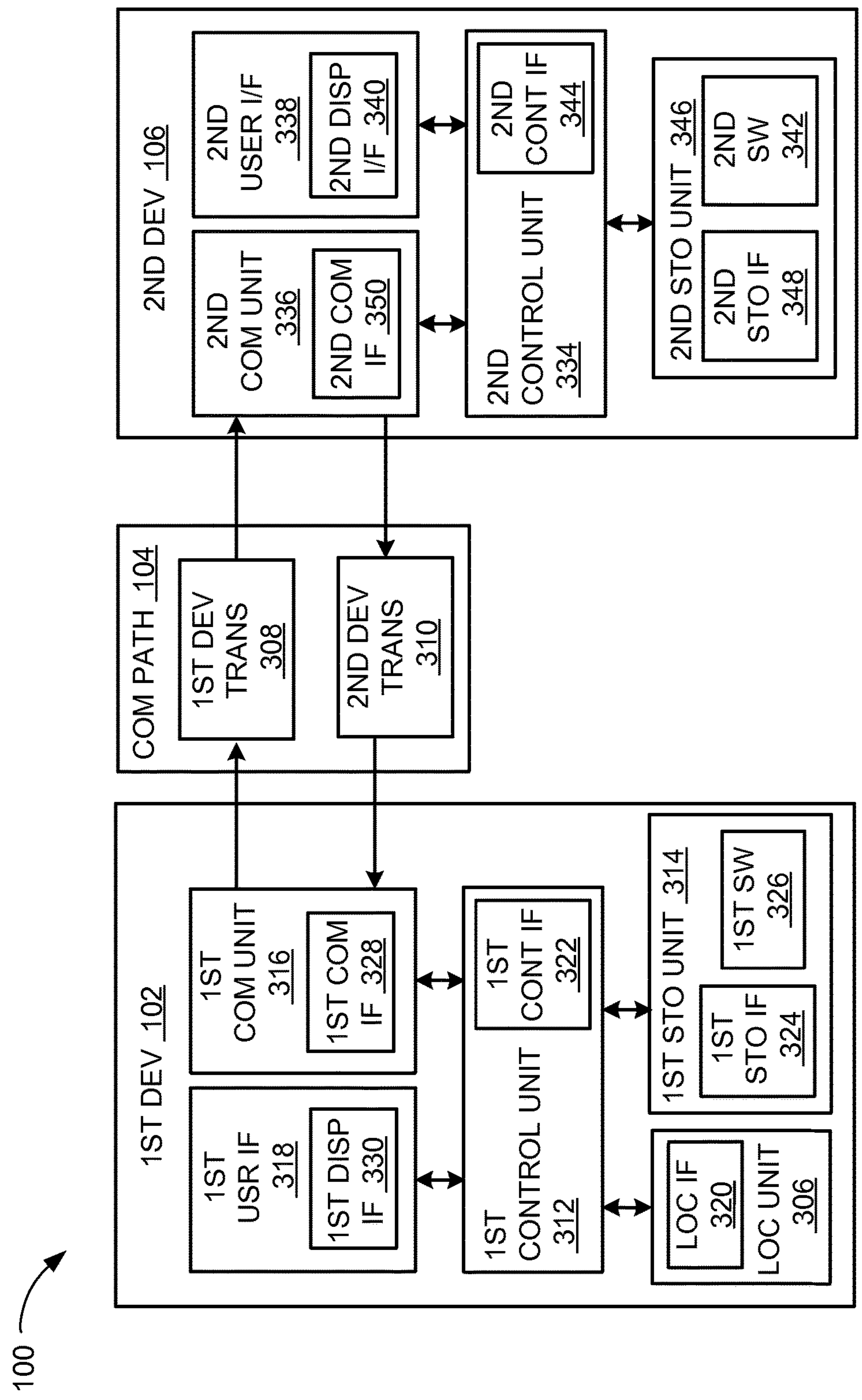
FIG. 3 is an exemplary block diagram of the computing system.

Referring now to FIG. 3, therein is shown an exemplary block diagram of the computing system 100. The computing system 100 can include the first device 102, the communication path 104, and the second device 106. The first device 102 can send information in a first device transmission 308 over the communication path 104 to the second device 106.

The second device 106 can send information in a second device transmission 310 over the communication path 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description in this embodiment of the present invention, the first device 102 will be described as a client device and the second device 106 will be described as a server device. The embodiment of the present invention is not limited to this selection for the type of devices. The selection is an example of an embodiment of the present invention.

The first device 102 can include a first control unit 312, a first storage unit 314, a first communication unit 316, and a first user interface 318. The first control unit 312 can include a first control interface 322. The first control unit 312 can execute a first software 326 to provide the intelligence of the computing system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as user history or user preferences. The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the computing system 100. The first control unit 312 can also execute the first software 326 for the other functions of the computing system 100. The first control unit 312 can further execute the first software 326 for interaction with the communication path 104 via the first communication unit 316.

The second device 106 can be optimized for implementing an embodiment of the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the computing system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 102 over the communication path 104.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the such as user history or user preferences. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The computing system 100 can be executed by the first control unit 312, the second control unit 334, or a combination thereof. For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the computing system 100 is described by operation of the first device 102 and the second device 106. It is understood that the first device 102 and the second device 106 can operate any of the modules and functions of the computing system 100.

Figure 4:
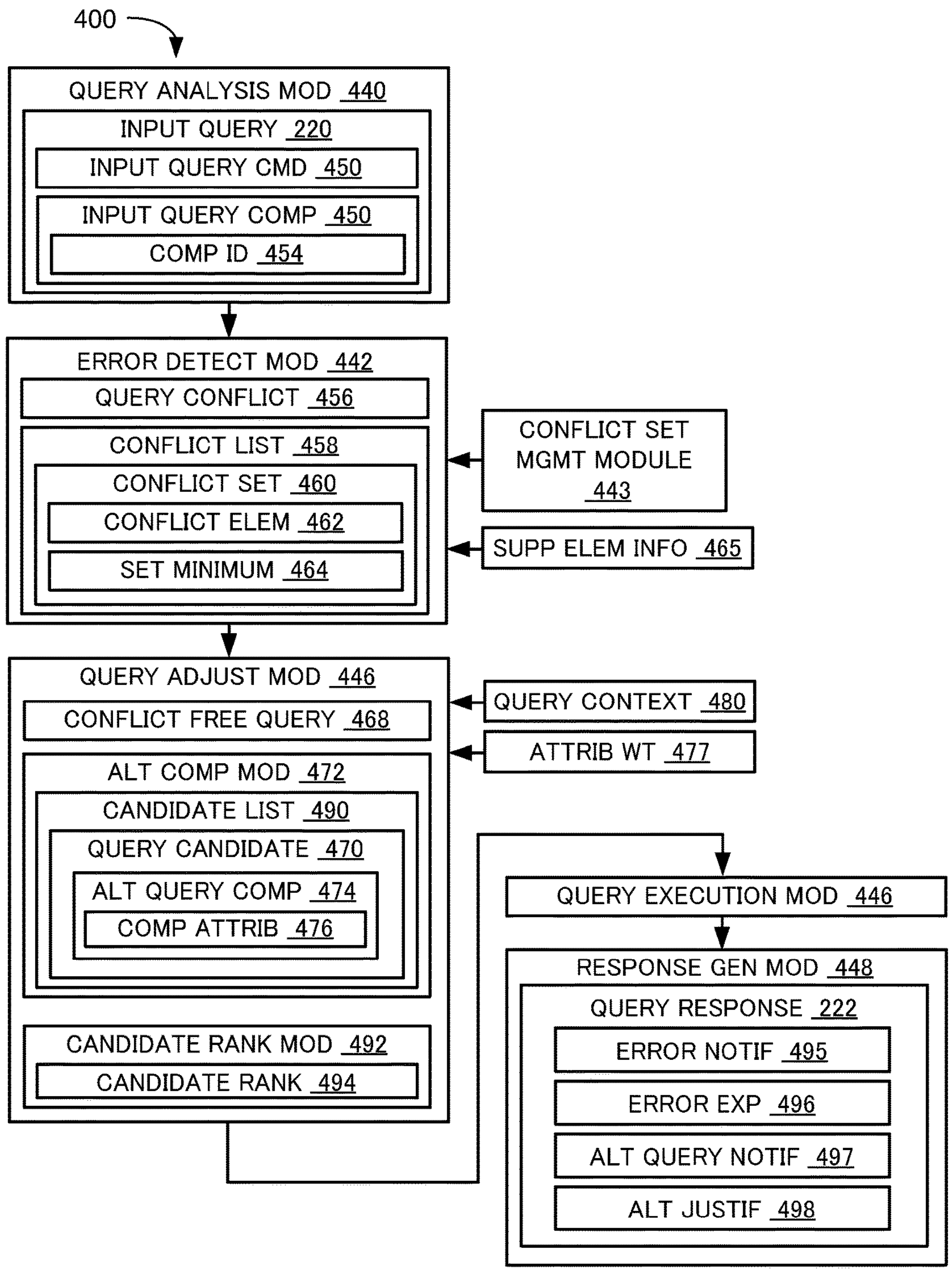
FIG. 4 is a control flow of the computing system.

Referring now to FIG. 4, therein is shown a control flow of the computing system 100 of FIG. 1. The computing system 100 can include a query analysis module 440, an error detection module 442, a query adjustment module 444, a query execution module 446, and a response generation module 448. The query analysis module 440 can be coupled to the error detection module 442. The error detection module 442 can be coupled to the query adjustment module 444. The query adjustment module 444 can be coupled to the query execution module 446. The query adjustment module 444 can be coupled to the response generation module 448.

The query analysis module 440 is for identifying actions and components in the query. As an example, the query analysis module 440 can receive the input query 220 with the first control interface 322 of FIG. 3 from the first user interface 318 of FIG. 3, the first communication interface 328 of FIG. 3, or a combination thereof. In another example, the input query 220 can be received, stored, or a combination thereof in the first storage unit 314 or the second storage unit 346, both of FIG. 3, prior to or following processing by the first control unit 312.

In one instance, the input query 220 can be an explicit request or command, such as a request or command by the device user to the first device 102 to execute or perform a task or operation. For example, the input query 220 can be a request to find a location, such as "Get me directions to Hungry Howie's in Santa Cruz" or "find Waffle House in Los Angeles", a request to contact an individual, such as "Call Steve", or to use an application, such as "Play 'We Are the Champions' performed by 'Freddie Mercury'" with a media or music player. In another instance, the input query 220 can be an implicit request or command, such as a request or command without direct user input. For example, the input query 220 that is implicit can be preemptive or proactive request based on context triggers. As a specific example, the context trigger for the input query 220 that is implicit can be based on the habits or preferences of the user, such as an automatically generated request to play workout music when the user is at the gym or a quest to disable sounds at specific times, such as during a scheduled meeting for the user or when the user is asleep.

The query analysis module 440 can analyze the input query 220 to identify an input query command 450, input query components 452, or a combination thereof. The input query command 450 is the requested action or the task of the query. As an example, the input query command 450 can be the request for action to be taken or executed by the computing system 100. For instance, the input query command 450 can be the action of searching, as denoted by the phrase "get me directions to", contacting, as denoted by the word "call", or activating, as denoted by the word "play", as in the above examples of the input query 220.

The input query components 452 are the synthetic components, semantic components, or a combination thereof that are results of parsing of the received natural language query. For example, the input query components 452 can be the subjects of the action or task of the input query command 450. As a specific example, the input query components 452 can be a specific location, such as "Hungry Howie's" or "Waffle House", a geographic region such as "Santa Cruz" or "California", an individual or person in a contact list such as "Steve", an application or information stored on the first device 102 such as the song "We Are the Champions", as in the above examples of the input query 220.

The input query 220 can include one or more of the input query components 452. For example, the input query 220 of "Get me directions to Hungry Howie's in Santa Cruz" can include two of the input query components 452: "Hungry Howie's" and "Santa Cruz". In another example, the input query 220 of "Find an Italian restaurant in San Jose that allows dogs" can include three of the input query components 452: "Italian restaurant", "San Jose", and "allows dogs".

The query analysis module 440 can analyze the input query 220 to identify the input query command 450 and the input query components 452 in a number of different ways. For example, the query analysis module 440 can be based in syntax, such as grammar, or semantics. In another example, the query analysis module 440 can parse the words of the input query 220 with speech recognition methods to identify key words or phrases corresponding to words or phrases that are recognized by the query analysis module 440 as the input query command 450 or the input query components 452.

The query analysis module 440 can generate a component identifier 454 for the input query components 452. The component identifier 454 is a label or information that describes what the input query components 452 is or represents. For example, the component identifier 454 can be a label that classifies the input query components 452 of "Hungry Howie's" or "Waffle House" as a restaurant; "Santa Cruz" as a city; "Steve" as the name of a person; "We Are the Champions" as a song; and "Freddie Mercury" as the name of a person or music artist.

The computing system 100 can detect errors in the input query 220 prior to execution of the input query 220 with the error detection module 442. The error detection module 442 is for determining whether an error will occur prior to processing or execution of the query. For example, the error detection module 442 can determine when the input query command 454, the input query components 452, or a combination thereof will generate an error before or prior to processing or execution of the input query 220. For example, the error detection module 442 can detect and error such an inability to perform the input query 220 or failure to provide a response by the computing system 100. The error detection module 442 can determine that an error in processing or executing the input query 220 will occur based on detection of a query conflict 456 in the input query 220.

The query conflict 456 is an error or conflict between components or actions of a query that will prevent execution of the query. The query conflict 456 can occur between one or more of the input query components 452, the input query components 452 and the input query command 450, or a combination thereof. For example, the query conflict 456 can occur when the input query command 450 to find locations in a combination of two of the input query components 452 does not exist, such as when a requested restaurant does not exist in a requested city.

The error detection module 442 can detect the query conflict 456 between one or more of the input query components 452 based on inclusion of the input query components 452 in an instance of conflict sets 460. The conflict sets 460 are predetermined sets of associated semantic concepts that will produce errors or prevent execution of the query by the system when representations of the semantic concepts are present in a single query.

The semantic concepts of the conflict sets 460 can be represented as conflict elements 462 that define the scope of the conflict. For example, one instance of the conflict sets 460 can include the conflict elements 462 of "Hungry Howie's Restaurant" and "located only in the city of Hayward, Calif.", since the input query 220 including a request for the restaurant named "Hungry Howie's" in a city outside "Hayward, Calif." will generate the query conflict 456.

The conflict sets 460 can represent a set minimum 464. The set minimum 464 is occurs when the scope of the elements for a conflict set cannot be further broadened. For example, one of the conflict sets 460 including the conflict elements 462 of "Waffle House" and "the city of San Francisco" would not be the set minimum 464 since the instance of the conflict elements 462 "the city of San Francisco" can be geographically broadened to "state of California" because "Waffle House" restaurants do not exist in any city in the state of California.

In one implementation, the error detection module 442 can detect the query conflict 456 based on inclusion of the input query components 452 in one of the conflict sets 460 of a conflict list 458, which is a list or knowledge base that includes all existing instances of the conflict sets 460. For example, the error detection module 442 can detect that the query conflict 456 exists between one or more of the input query components 452 by searching the conflict list 458 and determining when the input query components 452 exist as one of the conflict sets 460 in the conflict list 458.

In another implementation, the error detection module 442 can detect the query conflict 456 based on supplemental element information 465 associated with the conflict elements 246. The supplemental element information 465 is information that provides additional description or context for the semantic concepts of the conflict elements 462. For example, the supplemental element information 465 can be information that can be logically derived or inferred from the conflict elements 462, such as through a knowledge graph, a commonsense knowledge base, or background knowledge base. As a specific example, the supplemental element information 465 for one instance of the conflict elements 462 representing the state of California can include geographic information, such as cities and counties, demographic information, or other background information.

The error detection module 442 can detect the query conflict 456 with the supplemental element information 465 to infer inclusion of the input query components 452 of the input query 220 in the conflict set 460. For example, the error detection module 442 can infer that one of the input query components 452 of "city of San Francisco" is included in one of the conflict sets 460 having one of the conflict elements 462 of "the state of California" based on the supplemental element information 465 including California geographical information.

The computing system 100 can include a conflict set management module 443, coupled to the error detection module 442. The conflict set management module 443 is for updating the conflict list 458 with additional instances of the conflict sets 460 or modifying existing ones of the conflict sets 460. The conflict set management module 433 can generate the conflict sets 460 during online analysis, such as analysis of real time, direct, or active system interaction with the user, or offline analysis, such as analysis of generally available information. An example of online analysis can include the analysis of errors that occur during processing of input query 220 when the error detection module 442 initially does not determine or identify the query conflict 456 in the input query 220.

Examples of offline analysis can include statistical analysis or qualitative analysis. In a specific example of statistical analysis, the conflict set management system 100 can identify new instances of the conflict sets 460 based on correlations between potential ones of the conflict elements 462. In a specific example of the qualitative analysis, the conflict set management system 100 can analyze the available information or search space to identify new instances of the conflict sets 460.

In one implementation, the conflict set management module 443 can automatically update the conflict list 458 with new instances of the conflict sets 460 or corrections to existing instances of the conflict sets 460 based on errors that are discovered during subsequent execution or processing of the input query 220. In another implementation, the conflict set management module 443 can be manually updated with new instances of the conflict sets 460 or corrections to existing instances of the conflict sets 460 with periodic updates, such as from a system administrator.

The conflict list 458 can be a closed or inclusive list of the conflict sets 460. For example, the conflict list 458 can be an extensive known list of group of the conflict sets 460 having all possible combinations of the conflict elements 462 rather than only a grouping or list of the conflict sets 460 based solely on previous errors when processing or executing the input query 220, such as when the system 100 encounters an error during processing "learning on the fly" or through cached errors during failed processing or execution of the input query 220.

The conflict list 458 can include a frequency index 466. The frequency index 466 is a subset of the conflict sets 460 based on the frequency of or likelihood of identification as the query conflict 456. For example, the conflict set management module 443 can generate the frequency index 466 with the conflict sets 460 that have been identified in the input query 220 for other users of similar demographic to the user. In another example, the conflict set management module 443 can generate the frequency index 466 as a dynamic index based on context. As a specific example, the frequency index 466 can be generated to include the conflict sets 460 based on location or time of day.

It has been discovered that the frequency index 466 improves efficiency in identifying the query conflict 456 of the input query 220. The frequency index 466 reduces the initial number of the conflict sets 460 available to the error detection module 442 when determining whether the query conflict 456 exists in the input query 220, which improves efficiency of the computing system 100.

The query adjustment module 444 is for generating a modified query when an error is detected in the original query. For example, the query adjustment module 444 can generate a conflict free query 468, based on modification of the input query components 452 of the input query 220, when the error detection module 442 detects the query conflict 456 in the input query 220.

The conflict free query 468 is a modification of the original query capable of being processed or executed without input error and maintains similarity of purpose or intent with the original query. For example, the conflict free query 468 can be a modification of the input query 220. More specifically, the conflict free query 468 can be the input query 220 that has been modified to remove any detected errors or conflicts, such the query conflict 456 detected in the input query 220, while retaining semantic similarity to the input query 220. As a specific example, if the input query 220 includes a request for directions to a specific restaurant that does not exist in the requested city, the conflict free query 468 can be generated to retain semantic similarity by modifying the input query 220 to replace the specific restaurant with another similar restaurant in the same city. The conflict free query 468 can be generated prior to execution of the input query 220 to avoid or prevent execution of the input query 220 having the query conflict 456, thus preventing unnecessary usage of resources of the computing system 100.

The query adjustment module 444 can generate the conflict free query 468 by generating one or more alternative queries and selecting one of the alternative queries most similar to the original query. For example, the query adjustment module 444 can generate one or more query candidates 470 and select one of the query candidates 470 that is most similar in intent or purpose to the input query 220.

The query candidates 470 are variations of the original query with adjustments, changes, or substitutions to one or more components of the query. For example, the query candidates 470 can be a variation of the input query 220 having one or more of the input query components 452 changed or replaced.

The query adjustment module 444 can generate the query candidates 470 with an alternate component module 472. The alternate component module 472 is for identifying alternative or replacement components that are similar to the original components based on the characteristics or attributes of the original components of the query. For example, the alternate component module 472 can generate one or more of the query candidates 470 by replacing or changing the input query components 452 of the input query 220 with alternate query components 474.

The alternate query components 474 are components of the query having similar or related attributes that can be substituted for original components in the query. For example, the alternate query components 474 for of the input query components 452 can be components having similar or related component attributes 476.

The component attributes 476 are details or information that describes the components. For example, the component attributes 476 can be categorical information, genre information, geographical information, biographical information, information about associations to the component in the query, or any other information that can be used to characterize the input query components 452 or the alternate query components 474.

As a specific examples, the component attributes 476 for one of the input query components 452 of "Hungry Howie's" can include restaurant locations, cuisine type, specialties or popular menu items, user ratings or reviews, average meal cost, such as "popular for pizza", "single location in the city of Hayward, Calif.", and "fast food". In another specific example, the component attributes 476 for one of the input query components 452 of "Santa Cruz" can include geographic location of the city, neighboring cities or towns, and the county and country of the city, such as "located in Santa Cruz County", "located in California, USA", and "neighboring cities of Aptos and Soquel".

The alternate component module 472 can generate one or more of the alternate query components 474 by identifying and selecting components matching or having similar ones of the component attributes 476 of the input query components 452. The alternate component module 472 can determine similarity between the component attributes 476 of the input query components 452 and the component attributes 476 of alternate query components 474 by various methods. For example, the alternate component module 472 can determine similarities based on information from a knowledge base or through inferences generated from machine learning.

In another example, the alternate component module 472 can determine similarity between the input query components 452 and the alternate query components 474 based on attribute weights 477. The attribute weights 477 are for determining the importance of an attribute when selecting a replacement of a component in the original query. As specific example, the alternate component module 472 can provide or assign the attribute weights 477 for different ones of the component attributes 476 associated with the input query components 452 based on relevance, such as user information, including user preference, user history, and user schedule, or context information, including time of day or social trends. To continue the example, the alternate component module 472 can provide or assign a greater value of the attribute weights 477 to the component attributes 476 having a higher relevance.

In one implementation in the example described above, the computing system 100 can detect the query conflict 456 between the input query components 452 of "Hungry Howie's" and "Santa Cruz" in the input query 220 of "Get me directions to Hungry Howie's in Santa Cruz". To continue the example, the alternate component module 472 can generate the alternate query components 474 for the input query components 452 of "Hungry Howie's", "Santa Cruz", or a combination thereof to match with the component attributes 476 of other potential components.

As a specific example, for the input query components 452 of "Hungry Howie's", the alternate component module 472 can generate the alternate query components 474 as pizza parlors or fast food restaurants in the city of Santa Cruz. In another specific example, for the input query components 452 of "Santa Cruz", the alternate component module 472 can generate the alternate query components 474 as the city of "Soquel, Calif." or "Aptos, Calif.". The alternate component module 472 can generate the component attributes 476 by searching various information sources, such as the internet, databases, and knowledge bases.

In another implementation, the alternate component module 472 can generate the alternate query components 474 based on the attribute weights 477. For example, the since the attribute weights 477 can represent the relevance of one of the component attributes 476 relative to other ones of the component attributes 476, the alternate component module 472 can generate the alternate query components 474 with having a higher value of the attribute weights 477 for the component attributes 476 matching those of the input query components 452.

The query adjustment module 444 can generate a candidate list 490 of the query candidates 470 with the alternate query components 474 and the input query 220. For example, the query adjustment module 444 can generate the query candidates 470 as a combination of the input query components 452 and the alternate query components 474. As a specific example, the query candidates 470 can be "Get me directions to Hungry Howie's in Aptos", "Get me directions to Hungry Howie's in Soquel", "Get me directions to Round Table Pizza in Santa Cruz", or "Get me directions to Pacific Avenue Pizza in Santa Cruz".

The number of instances of the query candidates 470 generated by the query adjustment module 444 for the candidate list 490 can be determined in a number of different ways. For example, the instances of the query candidates 470 in the candidate list 490 can be limited by a default or user generated threshold. In another example, the instances of the query candidates 470 in the candidate list 490 can include as many instances of the query candidates 470 having relevance or similarity to the input query 220 that can be generated by the query adjustment module 444.

The query adjustment module 444 can modify the candidate list 490 to remove instances of the query candidates 470 that include conflicts. For example, the query adjustment module 444 can send the candidate list 490 to the error detection module 442 to detect for the query conflict 456 in the query candidates 470 as described above. As a specific example, the error detection module 442 can detect the query conflict 456 between the input query components 452 of "Hungry Howie's" and the alternate query components 472 of "Aptos" and "Soquel" and the query adjustment module 444 can remove the query candidates 470 of "Get me directions to Hungry Howie's in Aptos" and "Get me directions to Hungry Howie's in Soquel". The modified instance of the candidate list 490 can be used by the query adjustment module 444 for generation of the conflict free query 468.

The query adjustment module 444 can determine which of the query candidates 470 in the modified instance of the candidate list 490 most closely matches the intent or purpose of the input query 220 with a candidate rank 494. The candidate rank 494 is a measure of similarity of a candidate or alternative query to the original query. For example, the query candidates 470 having a higher value of the candidate rank 494 can be more similar to the intent of the input query 220 than the query candidates 470 having a lower value of the candidate rank 494.

The query adjustment module 444 can calculate a candidate rank 494 for each of the query candidates 470 in the candidate list 490 or the modified instance of the candidate list 490 with a candidate rank module 492, which can be coupled to the alternate component module 472. The candidate rank module 492 can calculate the candidate rank 494 based on a query context 480 of the input query 220. The query context 480 are the factors for determining the relevance of an alternate query relative to the original query. For example, the query context 480 can be historical context, such as past usage or behavior of the user; user context including the preferences and other factors associated with the user, including the appointments and personal relationships of the user; or current context, including as events that are occurring at the time the query was made, such as communications received by the user, the time of day, the location of the user, or the current activities of the user.

The candidate rank module 492 can analyze the query context 480 to calculate candidate rank 494 for each of the query candidates 470 in the modified instance of the candidate list 490. For example, the candidate rank module 492 can analyze the content or substance of the query context 480 to determine the relative importance or relevance of the query candidates. As a specific example, the candidate rank module 492 can analyze the query context 480 that includes the current context of the current user location in the city of Aptos, Calif.; a received text message "I am in Santa Cruz. Let's meet at for dinner at Hungry Howie's for pizza!"; and the user context of a scheduled meeting with other friends in Santa Cruz after dinner. In this specific example, the candidate rank module 492 can determine that the cuisine of pizza and locations around the city of Santa Cruz are relevant for determining the candidate rank 494 of the query candidates 470 and calculate a higher score for the query candidates 470 that include pizza restaurants located in the city of Santa Cruz.

In an example where the input query 220 of "get me directions to Hungry Howie's in Santa Cruz" is associated with the first instance of the query candidates 470 of be: "get me directions to a pizza parlor in Santa Cruz"; the second instance of the query candidates 470 of: "get me directions to fast food in Santa Cruz"; the third instance of the query candidates 470 of: "get me directions to a pizza parlor in Aptos"; and the fourth instance of the query candidates 470 of: "get me directions to fast food in Soquel"; the candidate rank module 492 can calculate the candidate rank 494 with the information derived from the query context 480. More specifically, the candidate rank module 492 can calculate a higher value of the candidate rank 494 for the first instance of the query candidates 470 since the first instance is more relevant to the query context 480 from the above example, such as "Pizza" and "Santa Cruz", while the fourth instance of the query candidates 470 can be calculated with a lower relative value of the candidate rank 494.

The query adjustment module 444 can generate the conflict free query 468 based on selection according to the candidate rank 494 of the query candidates 470 in the candidate list 490. For example, the query adjustment module 444 can select one of the query candidates 470 having the highest value of the candidate rank 494 in the candidate list 490.

The query execution module 446 is for executing the conflict free query 468. The query execution module 446 can process or execute the task or request of the conflict free query 468, such as generate directions to a location, initiate a communication with an individual in the user's contact list, or operate an application on the first device 102.

The response generation module 448 is for generating a response based on modification of the input query 220. For example, the response generation module 448 can generate the query response 222 following detection of the query conflict 546 in the input query 220, following calculation of the candidate rank 494 for the query candidates 470, or following processing or execution of the conflict free query 468.

In one implementation, the response generation module 448 can generate the query response 222 following detection of the query conflict 546 in the input query 220 as a request for additional information or clarification. For example, when the computing system 100 determines that additional information or clarification is necessary to generate the conflict free query 468, the response generation module 448 can generate the query response 222 that can include a message, such as "please provide additional clarification".

In another implementation, the response generation module 448 can generate the query response 222 following calculation of the candidate rank 494 of the query candidates 470 for the conflict free query 468. For example, the response generation module 448 can generate the query response 22 to include a predetermined number of the query candidates 470 having the highest value of the candidate rank 494, which represents the highest degree of semantic similarity to the input query 220, for selection by the user.

In a further implementation, the response generation module 448 can generate the query response 222 following execution or processing of the conflict free query 468. For example, the response generation module 448 can generate the query response 222 to inform a user of execution or processing of the conflict free query 468 or can be the results of processing or execution of the conflict free query 468.

In yet a further implementation, the response generation module 448 can generate the query response 222 to include a user notification having an error notification 495, an error explanation 496, an alternate query notification 497, an alternate justification 498, or a combination thereof. The error notification 495 is a notification or message stating that an error exists in the input query 220. For example, the error notification 495 can be a message stating that the input query 220 cannot be processed because the computing system 100 detected the query conflict 456 in the input query 220.

The error explanation 496 is a notification or message that provides an explanation of why the query conflict 456 was detected in the input query 220. For example, for the input query 220 including a request to find a location within a city, the error explanation 496 can be a message stating that the location does not exist within the city or that the location is not within a particular distance from the city.

The alternate query notification 497 is a notification or message providing alternatives to the input query 220. For example, the alternate query notification 497 can be a message that states that the conflict free query 468 is an alternative to the input query 220 or can provide multiple instances of the query candidate 470 for selection by the user.

The alternate justification 498 is a notification or message providing an explanation for the alternatives to the input query 220. For example, the alternate justification 498 can include an explanation of why the conflict free candidate 468 was generated based on the component attributes 476.

As a specific example, in the above example of the input query 220 of "get me directions to Hungry Howie's in Santa Cruz", the response generation module 448 can generate the query response 222 the error notification 495, the error explanation 496, the alternate query notification 497, the alternate justification 498, or a combination thereof. For instance, the error notification 495 can include a message that states "Sorry, the request cannot be processed"; the error explanation 496 can include a message that states "there is no Hungry Howie's in Santa Cruz" or "there is no Hungry Howie's within 50 miles of your current location"; the alternate query notification 497 can include a message that states "there is a Pizza Hut and Uno's Pizzeria in Santa Cruz"; the alternate justification 498 can include a message that states "consider Pizza Hut since it is famous for pizza and you have a meeting near there after lunch".

The query response 222 can be presented on the first device 102. For example, the query response 222 can include an audio component, such as audio cues or a generated voice response, a visual component, such as text, video, or images, or a combination thereof. The computing system 100 can present the query response 222 on the first user interface 318, such as speakers or visual display of the first display interface 330.

It has been discovered that the computing system 100 provides improved processing efficiency. The detection of the query conflict 456 in the input query 220 reduces the likelihood of an error occurring during execution of the input query 220 which improves processing efficiency.

It has also been discovered that the computing system 100 provides accurate generation of the conflict free query 468. Generating the query candidates 470 having the candidate rank 494 calculated based on the query context 480 enables the computing system 100 to generate the conflict free query 468 most similar to the input query 220, which improves the accuracy of the conflict free query 468.

The computing system 100 has been described with module functions or order as an example. For example, the first software 326 of FIG. 3 of the first device 102 of FIG. 3 can include the modules for the computing system 100. As a specific example, the first software 326 can include the query analysis module 440, the error detection module 442, the conflict set management module 443, the query adjustment module 444, including the alternate component module and the candidate rank module 492, the query execution module 446, and the response generation module 448.

The first control unit 312 of FIG. 3 can execute the first software 326 for the query analysis module 440 to identify the input query command 450 and the input query components 452; the error detection module 442 to detect the query conflict 456; the query adjustment module 444 to generate the conflict free query 468 based on the input query components 452; the query execution module 446 to perform or execute the conflict free query 468; and the response generation module 448 to generate the query response 222 for the conflict free query 468. The first user interface 318 can receive the input query 220 and present the query response 222 on the first display interface 330.

The second software 342 of FIG. 3 of the second device 106 of FIG. 3 can include the modules for the computing system 100. For example, the second software 342 can include the query analysis module 440, the error detection module 442, the conflict set management module 443, the query adjustment module 444, including the alternate component module and the candidate rank module 492, the query execution module 446, and the response generation module 448.

The second control unit 334 of FIG. 3 can execute the second software 342 for the query analysis module 440 to identify the input query command 450 and the input query components 452; the error detection module 442 to detect the query conflict 456; the query adjustment module 444 to generate the conflict free query 468 based on the input query components 452; the query execution module 446 to perform or execute the conflict free query 468; and the response generation module 448 to generate the query response 222 for the conflict free query 468. The second user interface 338 of FIG. 3 can receive the input query 220 and present the query response 222 on the second display interface 340 of FIG. 3.

The modules of the computing system 100 can be partitioned between the first software 326 and the second software 342. For example, the second software 342 can include the error detection module 442 and the query adjustment module 444. The second control unit 334 can execute modules partitioned on the second software 342 as previously described. To continue the example, the first software 326 can include the presentation modification module 554.

Based on the size of the first storage unit 314 of FIG. 3, the first software 326 can include additional modules of the computing system 100. The first control unit 312 can execute the modules partitioned on the first software 326 as previously described.

The first control unit 312 can operate the first user interface 318 to receive the input query 220 and present query response 222. The first control unit 312 can operate the first software 326 to operate the first user interface 318.

The computing system 100 has been described with module functions or order as an example. The computing system 100 can partition the modules differently or order the modules differently. For example, the error detection module 442 can be coupled to the query execution module 446 for executing the input query 220 when error detection module 442 does not detect the query conflict 456 in the input query 220. Each of the modules can operate individually and independently of the other modules. Furthermore, data generated in one module can be used by another module without being directly coupled to each other.

The modules described in this application can be hardware implementation or hardware accelerators in the first control unit 316 of FIG. 3 or in the second control unit 338 of FIG. 3. The modules can also be hardware implementation or hardware accelerators within the first device 102 or the second device 106 but outside of the first control unit 316 or the second control unit 338, respectively, as depicted in FIG. 3. However, it is understood that the first control unit 316, the second control unit 338, or a combination thereof can collectively refer to all hardware accelerators for the modules.

The modules described in this application can be implemented as instructions stored on a non-transitory computer readable medium to be executed by a first control unit 312, the second control unit 336, or a combination thereof. The non-transitory computer medium can include the first storage unit 314 of FIG. 3, the second storage unit 346 of FIG. 3, or a combination thereof. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

The physical transformation from generating the conflict free query 468 results in the movement in the physical world, such as users reacting to the query response 222 based on the conflict free query 468. Movement in the physical world results in changes to the conflict free query 468 by changing the query context 480 when calculating the candidate rank 494 of the query candidates 470.

The control flow 400 can be a method of operation of a computing system 100 that includes: receiving an input query; identifying input query components in the input query; detecting a query conflict between one or more of the input query components; generating a conflict free query based on the input query components; and generating a query response for the conflict free query for displaying on a device.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:

a storage unit configured to receive an input query; and a control unit, coupled to the storage unit, configured to:

identify input query components in the input query;

detect a query conflict between one or more of the input query components based on inclusion of the input query components in a conflict set, wherein the conflict set is a set of associated semantic concepts defining a scope of the conflict;

generate a conflict free query by replacing one of the input query components based on query context including a historical context, a user context, and a current context of a user making the input query, wherein:

the historical context includes past usage or behavior of the user;

the user context includes preferences and other factors associated with the user, including appointments and personal relationships of the user:

the current context includes events occurring at the time the input query is made, including communications received by the user, a time of day, a location of the user, and current activities of the user; and generate a query response for the conflict free query for displaying on a device.

2. The system as claimed in claim 1 wherein the control unit is configured to detect the query conflict from a conflict list including the conflict set.

3. The system as claimed in claim 1 wherein the control unit is configured to detect the query conflict based on the conflict set representing a set minimum.

4. The system as claimed in claim 1 wherein the control unit is configured to generate the conflict free query based on selection of a query candidate.

5. The system as claimed in claim 1 wherein the control unit is configured to generate the conflict free query based on a candidate rank of a query candidate.

6. The system claimed in claim 1 wherein the control unit is configured to generate the conflict free query based on modifying the input query with an alternate query component.

7. The system as claimed in claim 1 wherein the control unit is configured to generate the conflict free query based on a component attribute of the input query components.

8. The system as claimed in claim 1 wherein the query response can include an error notification, an error explanation, an alternate query notification, an alternate justification, or a combination thereof.

9. A method of operation of a computing system comprising:

receiving an input query;

identifying input query components in the input query;

detecting a query conflict between one or more of the input query components based on inclusion of the input query components in a conflict set, wherein the conflict set is a set of associated semantic concepts defining a scope of the conflict;

generating a conflict free query by replacing one of the input query components based on query context including a historical context, a user context, and a current context of a user making the input query, wherein:

the historical context includes past usage or behavior of the user;

the user context includes preferences and other factors associated with the user, including appointments and personal relationships of the user;

the current context includes events occurring at the time the input query is made, including communications received by the user, a time of day, a location of the user, and current activities of the user; and generating a query response for the conflict free query for displaying on a device.

10. The method as claimed in claim 9 wherein detecting the query conflict includes detecting the query conflict from a conflict list including the conflict set.

11. The method as claimed in claim 9 wherein detecting the query conflict includes detecting the query conflict based on the conflict set representing a set minimum.

12. The method as claimed in claim 9 wherein generating the conflict free query includes generating the conflict free query based on selection of a query candidate.

13. The method as claimed in claim 9 wherein generating the conflict free query includes generating the conflict free query based on a candidate rank of a query candidate.

14. The method as claimed in claim 9 wherein generating the conflict free query includes generating the conflict free query based on modifying the input query with an alternate query component.

15. The method as claimed in claim 9 wherein generating the conflict free query includes generating the conflict free query based on a component attribute of the input query components.

16. The method claimed in claim 9 wherein the query response can include an error notification, an error explanation, an alternate query notification, an alternate justification, or a combination thereof.

17. A non-transitory computer readable medium including instructions for operating a computing system comprising:

receiving an input query;

identifying input query components in the input query;

detecting a query conflict between one or more of the input query components based on inclusion of the input query components in a conflict set, wherein the conflict set is a set of associated semantic concepts defining a scope of the conflict;

generating a conflict free query by replacing one of the input query components based on query context including a historical context, a user context, and a current context of a user making the input query, wherein:

the historical context includes past usage or behavior of the user;

the user context includes preferences and other factors associated with the user, including appointments and personal relationships of the user;

the current context includes events occurring at the time the input query is made, including communications received by the user, a time of day, a location of the user, and current activities of the user; and generating a query response for the conflict free query for displaying on a device.

18. The non-transitory computer readable medium as claimed in claim 17 wherein detecting the query conflict includes detecting the query conflict from a conflict list including the conflict set.

19. The non-transitory computer readable medium as claimed in claim 17 wherein detecting the query conflict includes detecting the query conflict based on the conflict set representing a set minimum.

20. The non-transitory computer readable medium as claimed in claim 17 wherein generating the conflict free query includes generating the conflict free query based on selection of a query candidate.

* * * * *